(12) United States Patent
Oran et al.

(10) Patent No.: US 7,835,406 B2
(45) Date of Patent: Nov. 16, 2010

(54) SURROGATE STREAM FOR MONITORING REALTIME MEDIA

(75) Inventors: David R. Oran, Acton, MA (US); Robert Andrew Drisko, Concord, MA (US); Joshua B. Gahm, Newtonville, MA (US); Atif Faheem, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 314 days.

(21) Appl. No.: 11/764,722

(22) Filed: Jun. 18, 2007

(65) Prior Publication Data

US 2008/0310316 A1 Dec. 18, 2008

(51) Int. Cl.
*H04J 3/12* (2006.01)

(52) U.S. Cl. .................. 370/522; 370/252; 370/496; 709/224

(58) Field of Classification Search ............ None
See application file for complete search history.

(56) References Cited

U.S. PATENT DOCUMENTS

| | | | |
|---|---|---|---|
| 4,788,656 A | 11/1988 | Sternberger |
| 4,907,277 A | 3/1990 | Callens et al. |
| 4,996,663 A | 2/1991 | Nemes |
| 5,414,704 A | 5/1995 | Spinney |
| 5,450,449 A | 9/1995 | Kroon |
| 5,617,421 A | 4/1997 | Chin et al. |
| 5,699,478 A | 12/1997 | Nahumi |
| 5,699,485 A | 12/1997 | Shoham |
| 5,806,086 A | 9/1998 | Kimmel et al. |
| 5,842,040 A | 11/1998 | Hughes et al. |
| 5,884,010 A | 3/1999 | Chen et al. |
| 5,898,837 A | 4/1999 | Guttman et al. |
| 5,943,347 A | 8/1999 | Shepard |
| 5,946,302 A | 8/1999 | Waclawsky et al. |
| 5,956,721 A | 9/1999 | Douceur et al. |
| 5,995,488 A | 11/1999 | Kalkunte et al. |
| 5,995,971 A | 11/1999 | Douceur et al. |
| 6,104,696 A | 8/2000 | Kadambi |
| 6,185,208 B1 | 2/2001 | Liao |
| 6,275,861 B1 | 8/2001 | Chaudri et al. |

(Continued)

OTHER PUBLICATIONS

Schulzrinne, et al., RTP: A Transport Protocol for Real-Time Applications, Network Working Group, 2003, pp. 1-92.*

(Continued)

*Primary Examiner*—Jason E Mattis
*Assistant Examiner*—James P Duffy
(74) *Attorney, Agent, or Firm*—Stolowitz Ford Cowger LLP (57) ABSTRACT

In one embodiment, a separate surrogate monitor stream provides real-time media monitoring statistics for non-media savvy protocols. The surrogate monitor stream contains packet transmission parameters, such as sequence numbers and time stamps, for associated media packets in the non-savvy media stream. The surrogate monitor stream also contains checksums derived from the media packets. The checksums are used to correlate the packets in the surrogate monitor stream with the media packets in the media stream. The information in the surrogate monitor stream is then used in conjunction with the non-savvy media stream to provide real-time media monitoring without having to modify existing infrastructure. For example, head-end video servers do not have to add Real-time Transport Protocol (RTP) support or deal with protocol upgrades like RTP/UDP co-existence.

18 Claims, 7 Drawing Sheets

U.S. PATENT DOCUMENTS

| | | | |
|---|---|---|---|
| 6,314,095 B1* | 11/2001 | Loa | 370/352 |
| 6,341,130 B1 | 1/2002 | Lakshman et al. | |
| 6,356,545 B1 | 3/2002 | Vargo et al. | |
| 6,389,006 B1 | 5/2002 | Bialik | |
| 6,421,802 B1 | 7/2002 | Schildbach et al. | |
| 6,434,153 B1 | 8/2002 | Yazaki et al. | |
| 6,438,695 B1 | 8/2002 | Maufer | |
| 6,507,562 B1 | 1/2003 | Kadansky et al. | |
| 6,542,508 B1 | 4/2003 | Lin | |
| 6,590,894 B1 | 7/2003 | Kerr et al. | |
| 6,611,502 B1 | 8/2003 | Seaman | |
| 6,629,141 B2 | 9/2003 | Elzur et al. | |
| 6,658,000 B1 | 12/2003 | Raciborski et al. | |
| 6,665,637 B2 | 12/2003 | Bruhn | |
| 6,671,722 B1 | 12/2003 | Stachura et al. | |
| 6,687,360 B2 | 2/2004 | Kung et al. | |
| 6,741,600 B1 | 5/2004 | Weiss et al. | |
| 6,757,654 B1 | 6/2004 | Westerlund et al. | |
| 6,760,309 B1 | 7/2004 | Rocherger et al. | |
| 6,801,496 B1 | 10/2004 | Saleh et al. | |
| 6,801,525 B1 | 10/2004 | Bodnar et al. | |
| 6,847,928 B1 | 1/2005 | Naka | |
| 6,854,117 B1 | 2/2005 | Roberts | |
| 6,868,069 B2* | 3/2005 | Knobbe et al. | 370/252 |
| 6,909,702 B2* | 6/2005 | Leung et al. | 370/278 |
| 6,928,482 B1 | 8/2005 | Ben-Nun et al. | |
| 7,010,611 B1 | 3/2006 | Wiryaman et al. | |
| 7,013,267 B1* | 3/2006 | Huart et al. | 704/207 |
| 7,036,049 B2 | 4/2006 | Ali et al. | |
| 7,055,174 B1 | 5/2006 | Cope et al. | |
| 7,062,689 B2 | 6/2006 | Slobodnik | |
| 7,139,242 B2 | 11/2006 | Bays | |
| 7,154,855 B2 | 12/2006 | Hardy | |
| 7,206,385 B2 | 4/2007 | Ethier et al. | |
| 7,248,682 B1 | 7/2007 | Oran | |
| 7,269,157 B2 | 9/2007 | Klinker et al. | |
| 7,286,467 B1 | 10/2007 | Sylvain | |
| 7,305,464 B2 | 12/2007 | Philipi et al. | |
| 7,324,499 B1 | 1/2008 | Borella et al. | |
| 7,436,830 B2 | 10/2008 | Ben-Nun et al. | |
| 7,454,494 B1 | 11/2008 | Hedayat et al. | |
| 7,483,400 B2 | 1/2009 | Kuusinen et al. | |
| 7,496,044 B1 | 2/2009 | Wing | |
| 2002/0016856 A1 | 2/2002 | Tallegas et al. | |
| 2002/0064273 A1 | 5/2002 | Tomikawa et al. | |
| 2002/0075895 A1 | 6/2002 | Yamaguchi et al. | |
| 2002/0116501 A1 | 8/2002 | Ho et al. | |
| 2002/0131425 A1 | 9/2002 | Shalom | |
| 2002/0141392 A1 | 10/2002 | Tezuka et al. | |
| 2002/0150050 A1 | 10/2002 | Nathanson | |
| 2002/0194361 A1 | 12/2002 | Itoh et al. | |
| 2003/0014705 A1 | 1/2003 | Suzuki et al. | |
| 2003/0023710 A1 | 1/2003 | Corlett et al. | |
| 2003/0026241 A1 | 2/2003 | Ono et al. | |
| 2003/0048786 A1 | 3/2003 | D'Annunzio | |
| 2003/0086425 A1 | 5/2003 | Bearden et al. | |
| 2003/0117959 A1 | 6/2003 | Taranov | |
| 2003/0120789 A1 | 6/2003 | Hepworth et al. | |
| 2003/0198249 A1 | 10/2003 | Klein et al. | |
| 2003/0204617 A1 | 10/2003 | Buchsbaum et al. | |
| 2003/0227917 A1 | 12/2003 | Maher, III | |
| 2004/0037267 A1 | 2/2004 | Bennett et al. | |
| 2004/0037320 A1 | 2/2004 | Dickson | |
| 2004/0042456 A1 | 3/2004 | Dittmann et al. | |
| 2004/0071135 A1 | 4/2004 | Jimmei et al. | |
| 2004/0073641 A1 | 4/2004 | Minhazuddin et al. | |
| 2004/0095894 A1 | 5/2004 | Eloranta et al. | |
| 2004/0141502 A1 | 7/2004 | Corson et al. | |
| 2004/0179513 A1 | 9/2004 | Smith et al. | |
| 2004/0181599 A1 | 9/2004 | Kreusch et al. | |
| 2004/0185836 A1 | 9/2004 | Pelaez et al. | |
| 2004/0203787 A1 | 10/2004 | Naghian | |
| 2004/0252694 A1 | 12/2004 | Adhikari et al. | |
| 2004/0264433 A1 | 12/2004 | Melpignano | |
| 2005/0102423 A1 | 5/2005 | Pelavin et al. | |
| 2005/0182850 A1 | 8/2005 | Kohno | |
| 2005/0220035 A1 | 10/2005 | Ling et al. | |
| 2005/0232227 A1 | 10/2005 | Jorgenson et al. | |
| 2005/0243733 A1 | 11/2005 | Crawford et al. | |
| 2005/0276276 A1 | 12/2005 | Davis | |
| 2006/0002366 A1 | 1/2006 | Kawaguchi et al. | |
| 2006/0010243 A1 | 1/2006 | DuRee | |
| 2006/0029065 A1* | 2/2006 | Fellman | 370/389 |
| 2006/0031445 A1 | 2/2006 | Rajan et al. | |
| 2006/0031510 A1 | 2/2006 | Beck et al. | |
| 2006/0059411 A1 | 3/2006 | Dacosta | |
| 2006/0106961 A1 | 5/2006 | Ebata et al. | |
| 2006/0107187 A1 | 5/2006 | Hannuksela | |
| 2006/0114855 A1 | 6/2006 | Zheng | |
| 2006/0126528 A1* | 6/2006 | Ramalho | 370/252 |
| 2006/0143300 A1 | 6/2006 | See et al. | |
| 2006/0182034 A1 | 8/2006 | Klinker et al. | |
| 2006/0221837 A1 | 10/2006 | Gardner et al. | |
| 2006/0221930 A1 | 10/2006 | Sweeney | |
| 2006/0280207 A1 | 12/2006 | Guarini et al. | |
| 2007/0036087 A1 | 2/2007 | Kangru | |
| 2007/0199052 A1 | 8/2007 | Sankaran et al. | |
| 2007/0230486 A1 | 10/2007 | Zafirov | |
| 2008/0037864 A1* | 2/2008 | Zhang et al. | 382/156 |
| 2008/0069002 A1* | 3/2008 | Savoor et al. | 370/241 |
| 2008/0159279 A1* | 7/2008 | Younis et al. | 370/389 |
| 2008/0170117 A1 | 7/2008 | Xiao | |
| 2008/0220765 A1* | 9/2008 | Chu et al. | 455/422.1 |
| 2008/0259924 A1 | 10/2008 | Gooch et al. | |
| 2008/0285452 A1 | 11/2008 | Oran | |
| 2008/0285463 A1 | 11/2008 | Oran | |
| 2008/0317011 A1 | 12/2008 | Datta et al. | |
| 2009/0010158 A1 | 1/2009 | Filsfils | |
| 2009/0119722 A1 | 5/2009 | VerSteeg | |

OTHER PUBLICATIONS

J. Postel, "User Datagram Protocol", Retrieved from http://www.faqs.org/rfcs/rfc768.html on Jun. 13, 2009, Originally published on Aug. 28, 1980, pp. 1-3.*

Pendleton, et al., Session Initiation Package for Voice Quality Reporting Event, Sipping Working Group, 2006, pp. 1-24.

Schulzrinne, et al., RPT: A Transport Protocol for Real-Time Applications, Network Working Group, 2003, pp. 1-92.

Liao et al., Adaptive recovery techniques for real-time audio streams, IEE Infocom 2001. Twentieth Annual Joint Conference of the IEEE Computer and Communications Societies. Proceedings. Apr. 22-26, 2001, vol. 2, pp. 815-823.

R. Braden; Network Working Group; Requirements for Internet Hosts- Communication Layers; Oct. 1989, pp. 1-115.

Information Sciences Institute, University of Southern California; Internet Protocol DARPA Internet Program Protocol Specification; Sep. 1981; pp. 1-49.

Information Sciences Institute, University of Southern California; Transmission Control Protocol, DARPA Internet Program Protocol Specification; Sep. 1981; pp. 1-88.

D. Singer and Desineni, "A General Mechanism for RTP Header Extensions", draft-ietf-avt-rtp-hdrext-12txt, Feb. 26, 2007.

Friedman, T. et al., "RTP Control Protocol Extended Reports (RTCP XR)" RFC 3611, Nov. 2003, 55 pages.

Stolowitz Ford Cowger Listing of Related Cases, Dec. 17, 2009.

Welch, A Proposed Media Delivery Index (MDI); Apr. 2006; RFC 4445.

Degermark, IP Header Compression; Feb. 1999; RFC 2507.

Rosenberg, An Offer/Answer Model with Session Description Protocol (SDP); Jun. 2002; RFC 3264.

Jonsson; Robust Header Compression (ROHC): A Link-Layer Assisted Profile for IP/UDP/RTP; Jan. 2006; RFC 4362.

B. Thompson, Tunneling Multiplexed Compressed RTP (TCRTP); Nov. 2005; RFC 4170.

Kevin Song X., "The ABC's of Network Security", The Certified Security Professional, Certification Magazine, Feb. 2004.

T.V. Lakshman et al. High-Speed Policy-Based Packet Forwarding Using Efficient Multi-Dimensional Range Matching. 1998, ACM SIGCOMM Computer Communication Review, vol. 28 No. 4.

Hamzeh, K., Pall G., Verthein, W. Taarud, J., Little, W. and G. Zom, "Point-to-Point Tunneling Protocol (PPTP)", RFC 2637, Jul. 1999.

* cited by examiner

FIG. 7

SURROGATE STREAM FOR MONITORING REALTIME MEDIA

TECHNICAL FIELD

The present disclosure relates generally to the field of networking.

BACKGROUND

Internet Protocol TeleVision (IPTV) deployments often suffer from video quality problems. These problems include single bit errors caused by line noise. The bits errors are transformed into packet loss by checksum algorithms at the link and transport layers operated in the video receiver.

It is necessary to characterize these video quality problems in order to then improve the video experience for IPTV subscribers. Unfortunately, most IPTV deployments deliver IPTV to subscribers via the User Datagram Protocol (UDP). The UDP does not provide the information needed for thoroughly analyzing real-time media streams. For example, UDP packets do not include packet sequence numbers and packet timestamps needed to detect dropped packets and packet jitter.

DESCRIPTION OF EXAMPLE EMBODIMENTS

Overview

Certain information may not be obtainable using protocols that are not savvy with respect to transporting real-time streaming media. For example, the User Datagram Protrocol (UDP) is used for transporting MPEG data. UDP lacks the necessary features for detecting loss or packet jitter information or for reporting such loss or jitter to a media source. However, dropped packets and packet jitter is easily identified using the Real-Time Transport Protocol (RTP). Thus, RTP expedites gathering of video and audio quality information which can be used to deliver enhanced multimedia stream quality.

In one embodiment, a separate surrogate monitor stream provides real-time media monitoring statistics for non-media savvy protocols. The surrogate monitor stream contains packet transmission parameters, such as sequence numbers and time stamps, for associated media packets in the non-savvy media stream. The surrogate monitor stream also contains checksums derived from the media packets. The checksums are used to correlate the packets in the surrogate monitor stream with the media packets in the media stream. The information in the surrogate monitor stream is then used in conjunction with the non-savvy media stream to provide real-time media monitoring without having to modify existing infrastructure. For example, head-end video servers do not have to add Real-time Transport Protocol (RTP) support or deal with protocol upgrades like RTP/UDP co-existence.

Description

Figure 1:
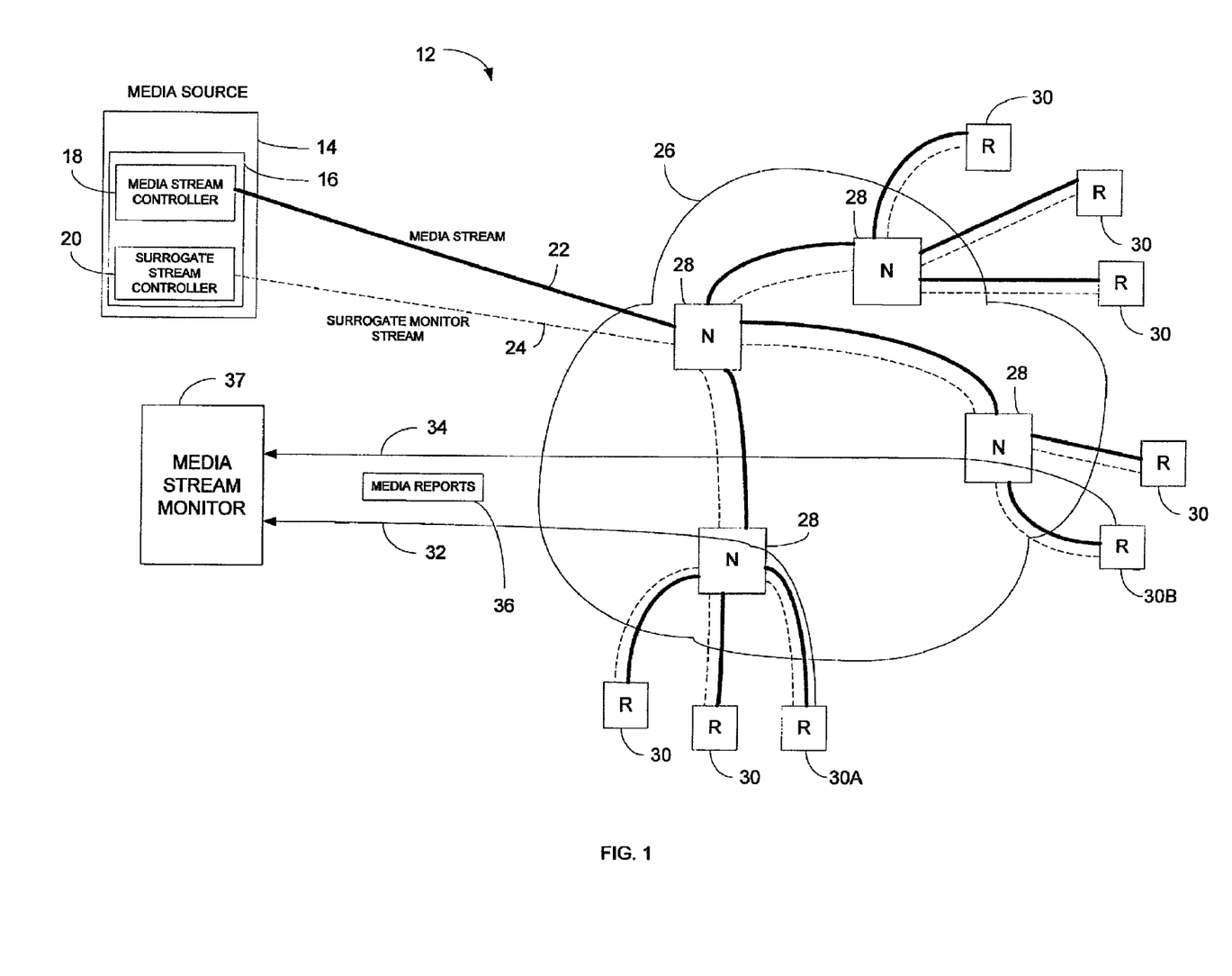
FIG. 1 is a block diagram showing a surrogate monitor stream.

Referring to FIG. 1, a media source 14 may be a server, computer, or any other type of network processing device that can source Internet Protocol (IP) media, such as video, audio, voice, data, etc., over an IP packet switched network 26. In this example, the media source 14 includes one or more processors 16 that encode and transmit a native media stream 22 to one or more receivers 30 over the IP network 26.

The receivers 30 can be any device that receives and then stores or renders a multicast or unicast media stream 22. For example, the receivers 30 can be Set Top Boxes (STB), Digital Video Recorders (DVR), computer terminals, Personal Computers (PCs), televisions with IP interfaces (IPTV), Voice over IP (VoIP) phones, cell phones, Personal Digital Assistants (PDA), etc.

Additionally, the receivers 30 could be edge devices in the IP network 26 which further process the media streams, or provide gateway functions to other kinds of networks. These include edge retransmission servers, Edge Quadrature Amplitude Modulators (EQAM) in a digital cable TV network, satellite up-links in a satellite TV distribution network, or media relays in mobile networks such as cellular telephony systems.

One or more processors 16 in one embodiment provide any conventional encoding and packet formatting required to send the media stream 22 to one or more of the receivers 30. Either the processors 16 and/or other logic circuitry, operate as a media stream controller 18 that encodes the media stream 22 into media packets. In one embodiment, the media stream 22 includes User Datagram Protocol (UDP) packets that contain MPEG data payloads. Of course, other packet protocols and payload formats could also be used.

The media stream 22 may be multicast or unicast to the receivers 30. In the multicast example, the receivers 30 may join a multicast group. The media packets in media stream 22 are then multicast by switch or router nodes 28 in the IP network 26 to the members of that multicast group. Multicasting or unicasting UDP media streams is known to those skilled in the art and is therefore not described in further detail.

The same or other processors 16 and/or other logic may also operate as a surrogate stream controller 20. The surrogate stream controller 20 generates a surrogate monitor stream 24 shown in dashed lines that is also either multicast or unicast to the different receivers 30. The surrogate monitor stream 24 is correlated with the native media stream 22 via checksums and used for providing the real-time media monitoring information that is not provided by media stream 22. For example, packet sequence number and timestamp information not normally carried in media stream 22 may be carried in surrogate monitor stream 24.

In one embodiment, the packets in the second monitor stream 24 might only include a media checksum and transmission parameters for the media packets in media stream 22 while omitting the payload of the original stream. In other words, the monitor stream 22 does not actually carry any voice or video media. Thus, the surrogate monitor stream 24 can have a very low bit rate compared to media stream 22. In the embodiment shown in FIG. 1, the new low bit rate 'checksum only' monitor stream 24 is produced by the media source 14 and consumed by the receivers 30. In one embodiment, the media source 14 is a modified media encoding device and the receivers 30 are Set Top Boxes (STBs), Personal Computers, or some other Customer Premises Equipment (CPE) device. Of course, the surrogate monitor stream 24 could also be used with other media sources 14 and media receivers 30 to deliver other media quality enhancement functionality such as error repair or fast channel change.

As mentioned above, the surrogate monitor stream 24 may only include the packet transmission parameters commonly contained in real-time media packets. For example, other than a checksum payload, the packets in monitor stream 24 only include RTP parameters such as a sequence number, timestamp, and synchronization source identifier. This relatively small checksum payload is then matched with the corresponding checksums generated from the actual media payloads contained in media stream 22.

The parameters in monitor stream 24 can be combined with information obtained from the corresponding media packets in media stream 22. This allows the receivers 30 to then generate the same media reports that would normally only be possible using a real-time media transport protocol, such as RTP.

For example, jitter information can be determined by comparing receive times for media packets in media stream 22 with packet timestamp information contained in monitor stream 24. In a similar manner, lost packets in media stream 22 can be detected by comparing sequence numbers from monitor stream 24 with the received media packets from media stream 22. Any sequence numbers received in monitor stream 24 that do not have corresponding media packet in media stream 22 (as determined by matching checksums) would then be identified as a lost packet. Other media stream metrics can also be derived.

Each receiver 30A and 30B correlates the packets in the surrogate monitor stream 24 with media packets in the media stream 22 and then independently generates reports 36 that identify lost packets, packet jitter, or any other media quality related information. These media stream metrics are then sent back to a media stream monitor 37 via reports 36.

Since the native media stream 22 is transmitted using any existing media transport protocol, control hardware or software 18 does not have to be modified. Further, the hardware or software in the receivers 30 that normally receives the media stream 22 also can remain "as is". Bandwidth requirements are also relatively low, since the packet payloads in monitor stream 22 might only contain media packet checksums.

Generating the Surrogate Monitor Stream

Figure 2:
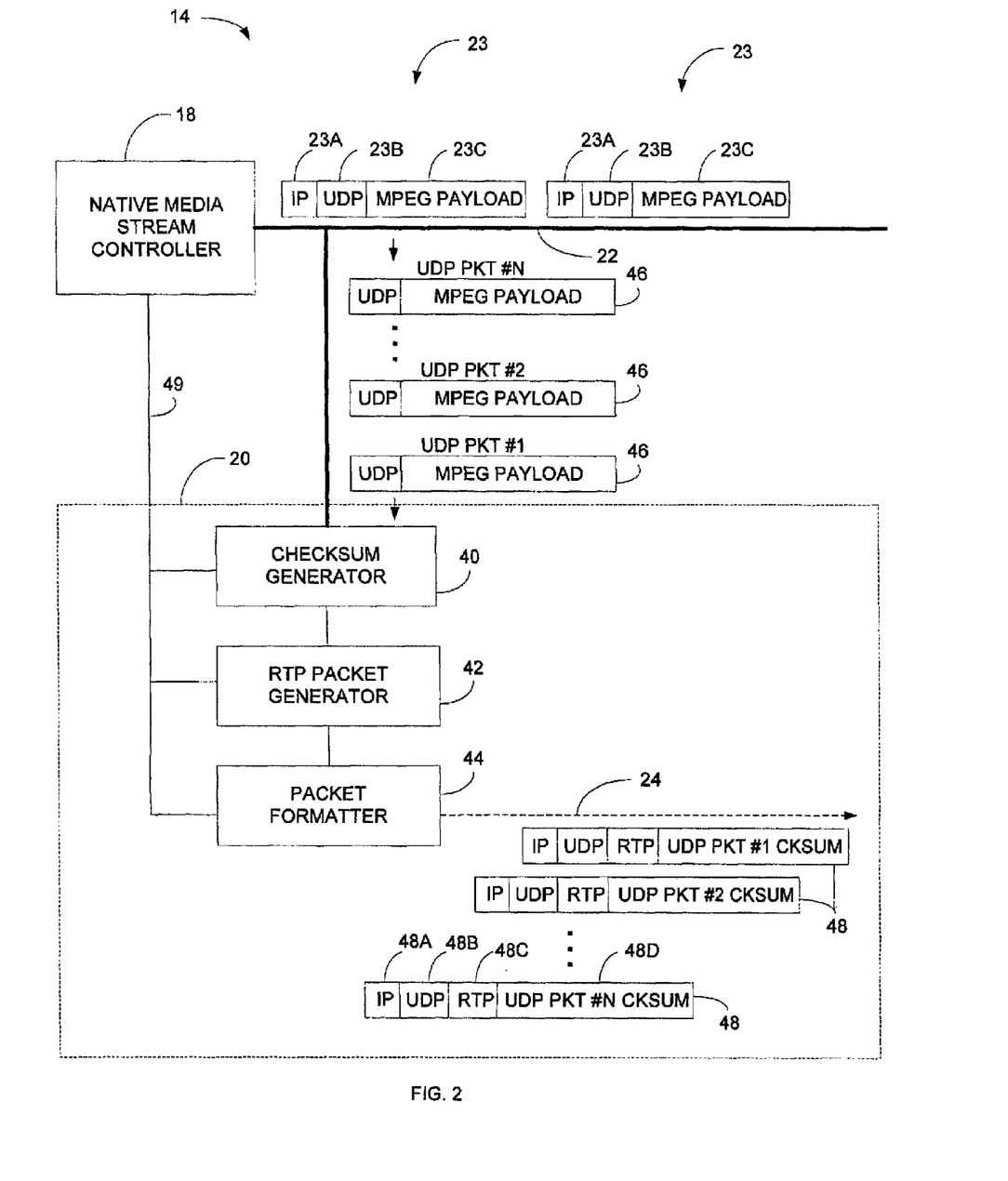
FIG. 2 shows how a source generates the surrogate monitor stream in FIG. 1.

FIG. 2 shows the media source 14 in more detail. The native media stream controller 18 encodes and formats media into media packets 23. In one example, the media packets 23 each include an IP header 23A, UDP header 23B, and MPEG payload 23C. As described above, the UDP header 23B does not contain the real-time media parameters that are provided for monitoring streaming media. For example, the UDP header 23B does not include a packet sequence number, timestamp, or media source identifier. Thus, media metrics like the number of dropped packets and packet jitter could not be derived from UDP media stream 22.

To compensate for these shortcomings, the surrogate stream controller 20 generates monitor packets 48 that include these necessary real-time monitoring parameters.

A checksum generator 40 first generates checksums 48D from the UDP packets 46 in the native media stream 22. A variety of different checksum algorithms can be used. Preferably, the checksum is collision resistant. This means it is unlikely that two UDP packets 46 containing different payload data will generate the same checksum. One example of an adequate, quick, and simple checksum technique is the conventional bit-wise Exclusive Or (XOR) checksum.

The checksum does not have to operate at a cryptographic resistant level. In other words, the checksum does not have to be resilient to unauthorized tampering, such as provided by (M)D5 or SHA1 checksums. However, these types of checksums can certainly be used if desired.

In this example, the monitor packets 48 include RTP headers 48C. An RTP packet generator 42 generates the RTP headers 48C that contain packet transmission parameters associated with media packets 23 in media stream 22. For example, the RTP header 48C may include a media payload type, a packet sequence number, packet timestamp value, and a media Synchronization SouRCe identifier (SSRC), among other fields. Any packet information needed to generate the RTP headers 48C is sent from controller 18 over control path 49.

A packet formatter 44 generates IP headers 48A, UDP headers 48B, and any other formatting required to send the monitor packets 48 to some or all of the same destinations as the media packets 23. The media stream controller 18, or some other processing device, may negotiate a media session, multicast groups, etc. with different receivers 30 in FIG. 1 using a signaling protocol suite, such as the Session Description Protocol (SDP) and Session Initiation Protocol (SIP), or the Realtime Streaming Protocol (RTSP). These signaling sessions may also be used for establishing the surrogate monitor stream 24. The multicast group address and any other session identifiers for the monitor stream 24 are then sent to controller 20 for generating packet headers 48A, 48B and 48C.

Thus, the new monitor packet payload 48D contains an identifier for associated UDP packet 46 in media stream 22. In one example, the identifier is a checksum for UDP packet 46. Any combination of the payload 23C and fields in the UDP header 23B may be used to generate the checksum 48D. The generated checksum 48D in the RTP packet payload 48D is then later correlated with the corresponding UDP packets 46.

It should also be understood that a checksum is not the only way to uniquely identify the media packets. For example, unique identifiers may be encoded into the media payload 236, UDP header 23B, or in some other header. In this case, one of the headers 48A, 48B, 48C, or the payload 48D in the monitor packet 48 would contain the same identifier contained in media packets 23.

A typical IPTV deployment delivers IPTV services as a multicast UDP stream and delivers Video On Demand (VOD) as a unicast UDP stream. A standard UDP IPTV video datagram would have [IP]+[UDP]+[MPEG payload=1316] bytes of data. Assuming a 2-byte checksum, the monitor packets 48 only have [IP]+[UDP]+[RTP]+[checksum=2], for a total of 42 bytes of data. Depending on the level of collision resistance desired, a four byte checksum could also be used, giving a monitor packet size of 48 bytes. A conventional standard definition MPFG-2 video stream includes 3.75 Mbits/Sec IPTV (=340 packets/sec). A conventional packet header size for RTP packets is 40 bytes=[IP=20+UDP=8+RTP=12]. Adding in a two-byte checksum, the surrogate monitor stream bit rate is estimated at (340 packets/sec*42 bytes/per monitor packet*8 bits/per byte=114 kbits/sec. This is approximately 5% of the bit rate for media stream 22.

Figure 3:
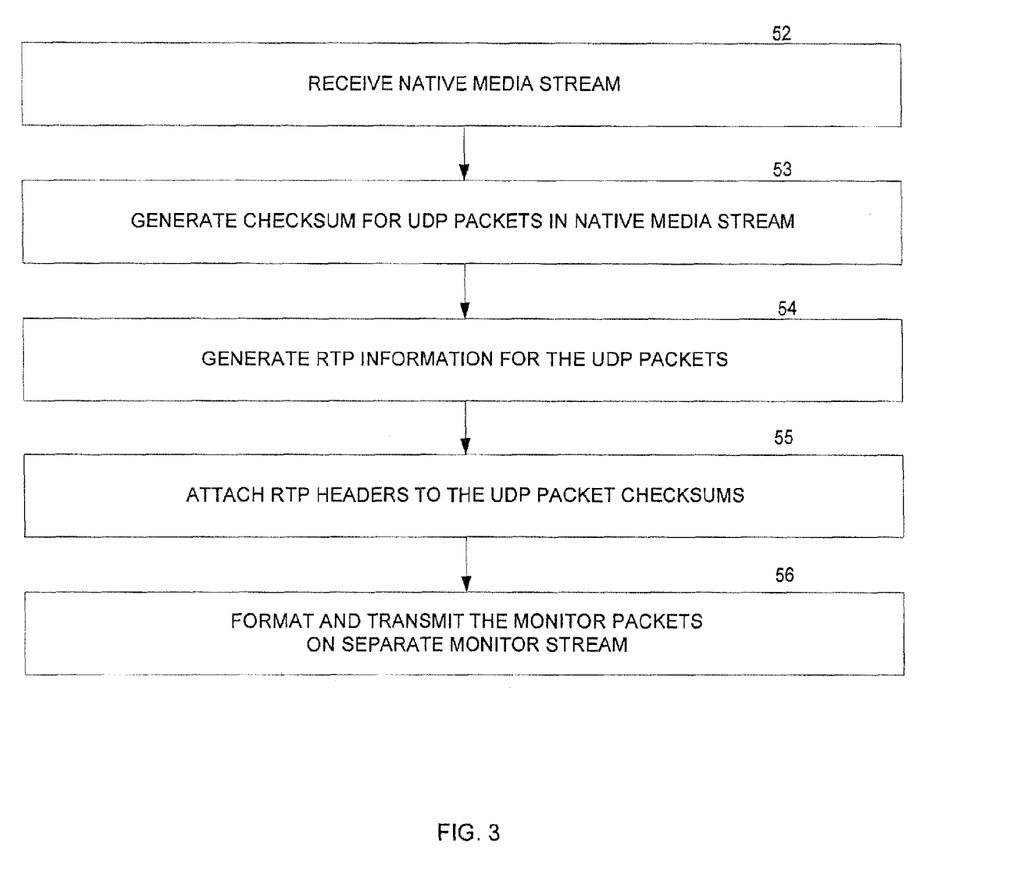
FIG. 3 is a flow diagram describing in more detail how the surrogate monitor stream is generated.

FIG. 3 describes the surrogate stream controller 20 in more detail. Referring to FIGS. 2 and 3, operation 52 receives the native media stream. The checksums 48D are generated for the UDP packets 46 in operation 53 and the RTP headers containing the sequence numbers and timestamp values for the UDP packets 46 are generated in operation 54. Operation 55 combines the RTP headers with the checksums for the same associated media packet 23. In operation 56, other headers, such as IP and UDP headers are added to form the monitor packets 48 which are then transmitted over the second surrogate monitor stream 24 to the receivers 30 in FIG. 1.

Receivers

Figure 4:
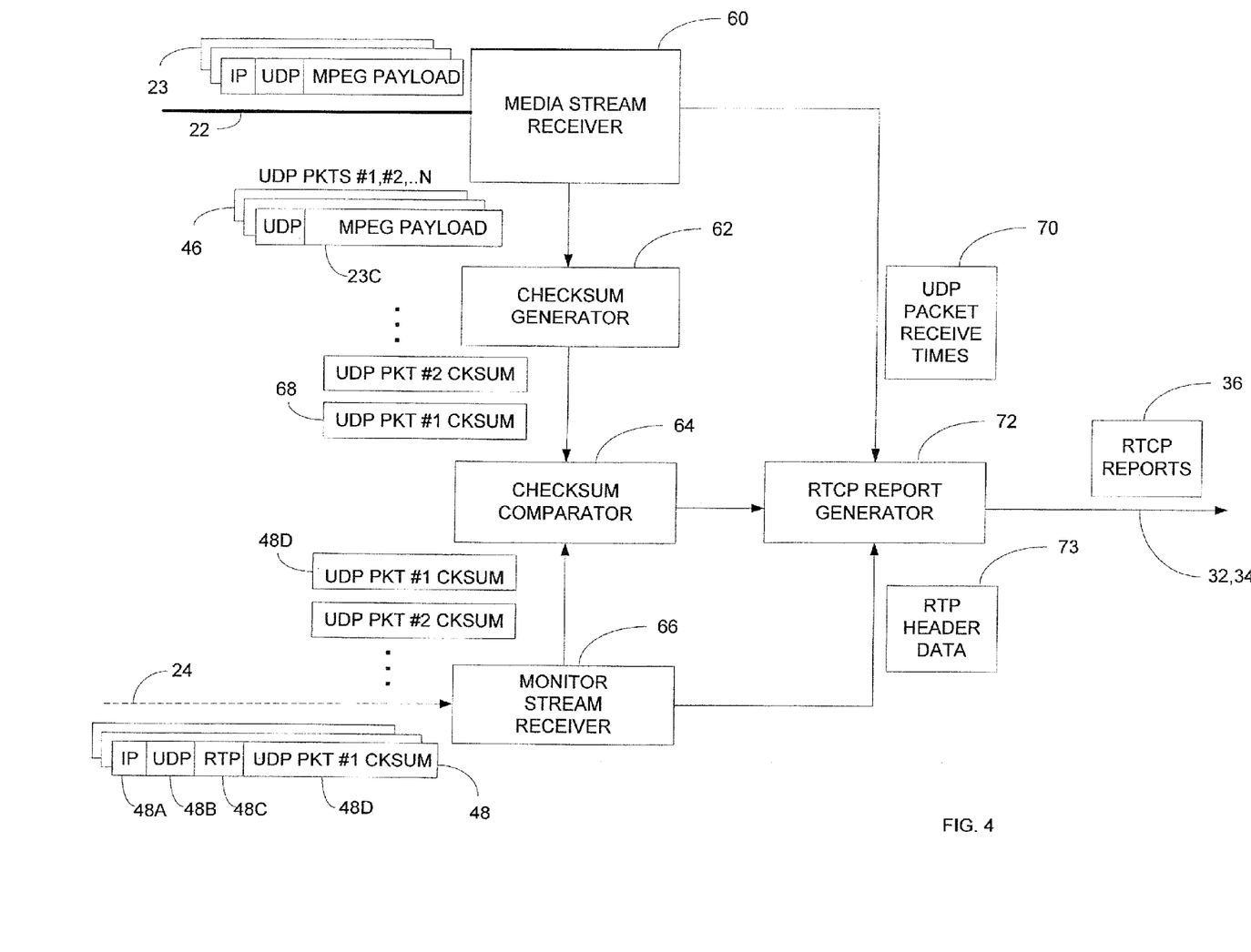
FIG. 4 shows how a receiver generates media packet metrics from the surrogate monitor stream in FIG. 1.

FIG. 4 describes in more detail how the receivers 30 in FIG. 1 correlate media packets 23 in the native media stream 22 with the monitor packets 48 in the surrogate monitor stream 24. A media stream receiver 60 receives the native media stream 22 and sends the UDP packets 46 to a checksum generator 62. The checksum generator 62 generates checksums 68 that are then sent to a checksum comparator 64.

A surrogate monitor receiver 66 receives the surrogate stream 24 and sends the checksums 48D contained in monitor packets 48 to the checksum comparator 64. The checksum comparator 64 compares the checksums generated from the media packets 23 with the checksums contained in monitor packets 48. The packets with matching checksums are identified.

The UDP packet receive times 70 for the matching UDP packet 46 and the RTP data 73 contained in the RTP headers 48C of the matching monitor packet 48 are sent to a Real-Time Control Protocol (RTCP) report generator 72. The RTCP report generator 72 then generates any of the RTCP reports and packet transmission metrics 36 that would normally be generated by a receiver receiving a conventional RTP media stream. The RTCP reports 36 may be sent to the media stream monitor 37 in FIG. 1.

Figure 5:
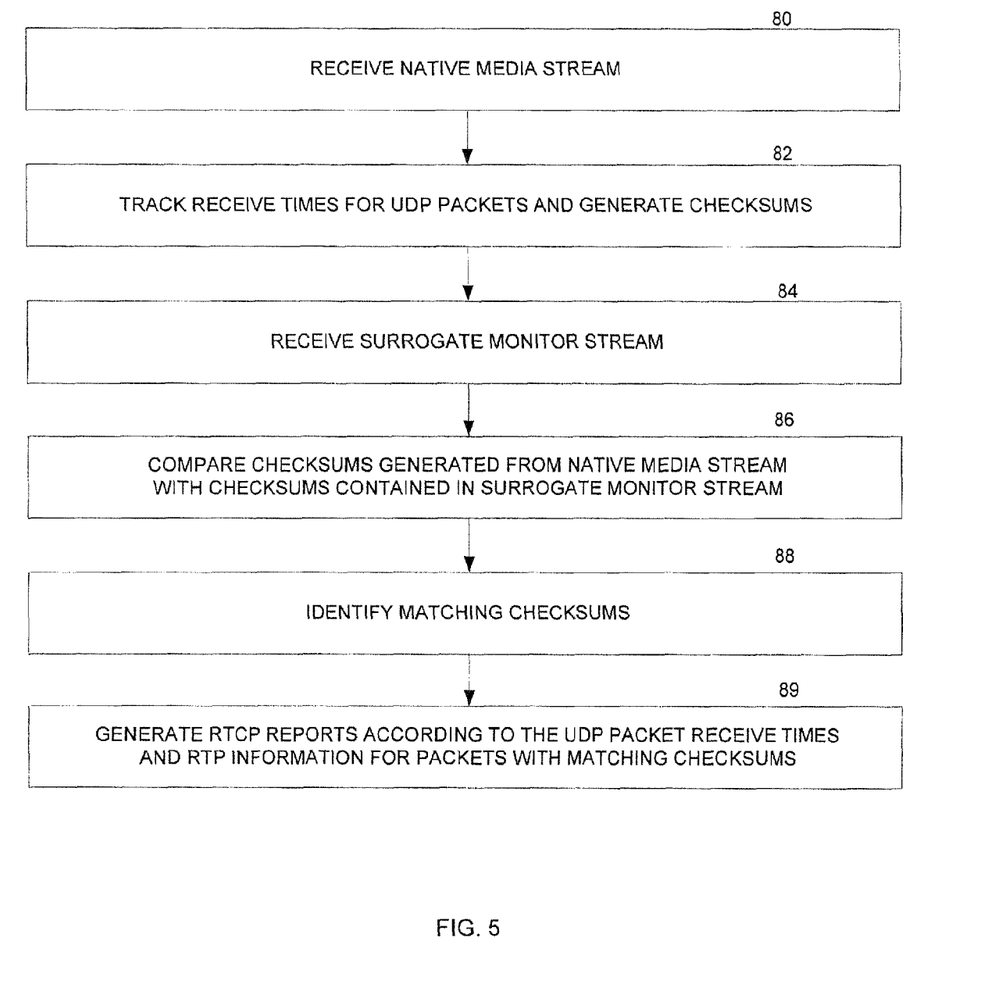
FIG. 5 is a flow diagram describing in more detail how the receiver in FIG. 4 operates.

FIG. 5 describes the receiver operations in more detail. Referring to FIGS. 4 and 5, the native media stream 22 is received in operation 80. The receive times of the UDP packets 46 are tracked and the checksums 68 for the UDP packets generated in operation 82. The surrogate monitor stream 24 is received in operation 86. The checksums 68 generated from the media packets 23 in operation 82 are compared with the checksums 48D contained in the monitor packets 48 in operation 86. Any matching checksums are identified in operation 88. The timing information 70 for the matching UDP packets 46 and the RTP information 73 for the matching monitor packets 48 are then used to generate RTCP reports 36 in operation 89.

It should be understood that any packet transmission metrics could be generated or calculated locally at the receivers 30. Alternatively, the raw RTP information may be sent to another device, such as the media monitor 37, for further analysis. It should also be noted that any packet parameters that are not normally contained in the UDP packets 46 can be provided via the monitor packets 48 in surrogate stream 24. This includes a variety of items that can be encoded in RTP header fields, especially through RTP header extensions that can carry additional data like SMPTE time code information.

In one example for media video receivers, a surrogate stream processing client on a STB stitches together the new RTP encapsulated checksum stream 24 with the UDP multicast stream 22 (normal IPTV) to produce a video stream that is effectively an RTP stream. The N-byte payload of the RTP stream 24 contains a key which can then be correlated to a given UDP stream packet 23. The surrogate stream processing client in receiver 30 then reports video quality information back to the source of the RTP stream 24, or to some other monitoring location, using standard RTCP machinery.

Alternative Embodiments

The operations described in FIGS. 4 and 5 can be deployed within any type of receiver and can be located in an existing piece of Customer Premise Equipment (CPE) or located in some other stand-alone device. For example, the operations described above may be incorporated into the software or hardware of a Set Top Box (STB). Alternatively, a standalone device may be separately attached to the coaxial cable or Ethernet cable or wireless LAN that separately receives the media stream 22 and the surrogate monitor stream 24. The standalone device could then independently of the STB or other CPE generate and send the RTCP reports 36 back to the media stream monitor 37 in FIG. 1.

In addition to providing annotation of the UDP packets 46 in the form of a surrogate monitor stream 24, the original UDP stream 22 can be merged with the checksum only RTP stream 24 to produce a RTP video stream, for consumption by a down stream device. For example, the RTP header information 48C in the monitor packets 48 could be combined with the MPEG payload 23C in the native media packets 23 to generate conventional RTP packets. The RTP packets can then be sent to any device capable of receiving RTP media streams. Creation of the new RTP stream can be performed at any server, node, gateway or receiver in the IP network 26 in FIG. 1.

The MPEG packets 23C transmitted in media stream 22 may already include UDP checksums in the UDP headers. While this is not common with UDP media streams used for IPTV or other multimedia application, some media applications already generate checksums for the MPEG payloads 23C. In this case, the receiver 30 receiving the media stream 22 correlates the checksums already contained in the UDP header of packets 46 with the corresponding checksums in the monitor packets 48.

Blocking

Figure 6:
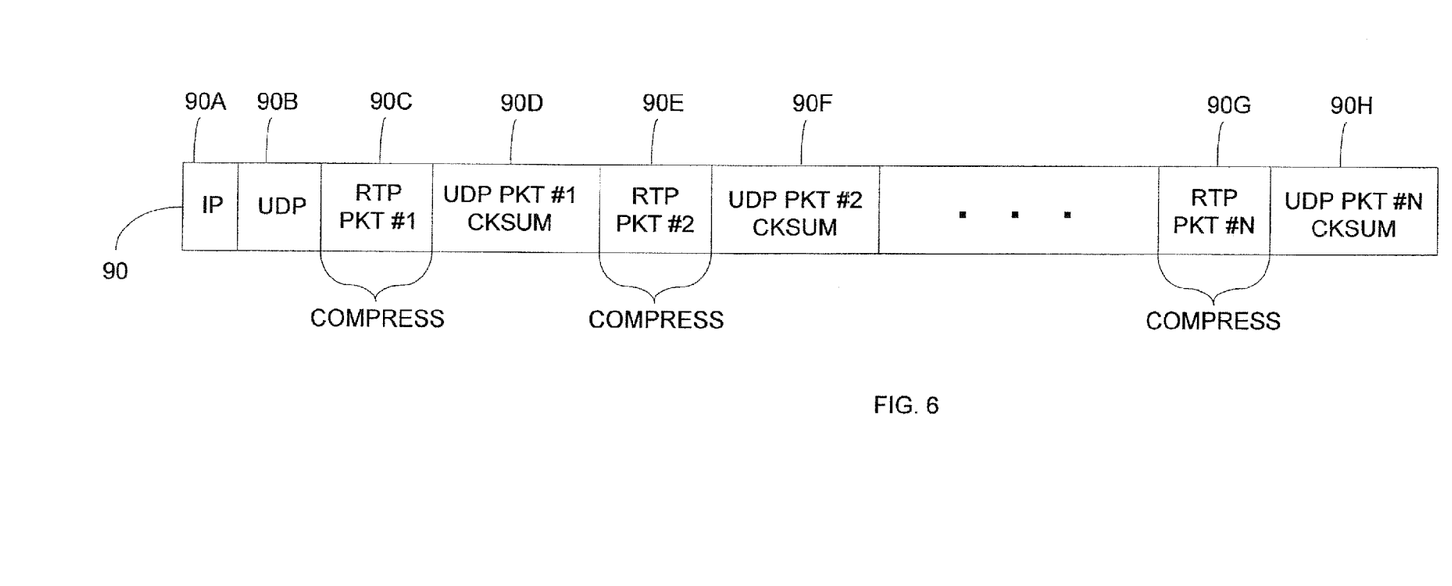
FIG. 6 is a block diagram showing how surrogate monitor information for multiple media packets is combined in a same monitor packet.

Referring to FIG. 6, the bandwidth for the surrogate monitor stream can be further reduced by combining multiple different RTP headers 90C, 90E and 90G and associated checksums 90D, 90F, and 90H, respectively, into the same block monitor packet 90. The RTP headers and UDP packet checksums for any number N of associated UDP packets 46 can be combined into the same block monitor packet 90, up to the maximum transmission unit (MTU) size in use on the netowrk. An IP header 90A and UDP header 90B are attached to the packet 90 and sent to the associated receivers 30.

A further optimization may include applying RTP header compression to the multiple RTP headers 90C, 90C and 90G in the same blocked monitor packet 90. RTP header compression is described in Request For Comment (RFC) 2508 which is herein incorporated by reference. In blocking mode, the monitor stream bit rate may reduce down approximately to the size of the RTP headers + the 2 or 4 byte checksums. Thus, a single block monitor packet 90 may reduce the bandwidth down to 64 kbits/sec which is less than 2% additional bandwidth compared with the media stream 22.

Figure 7:
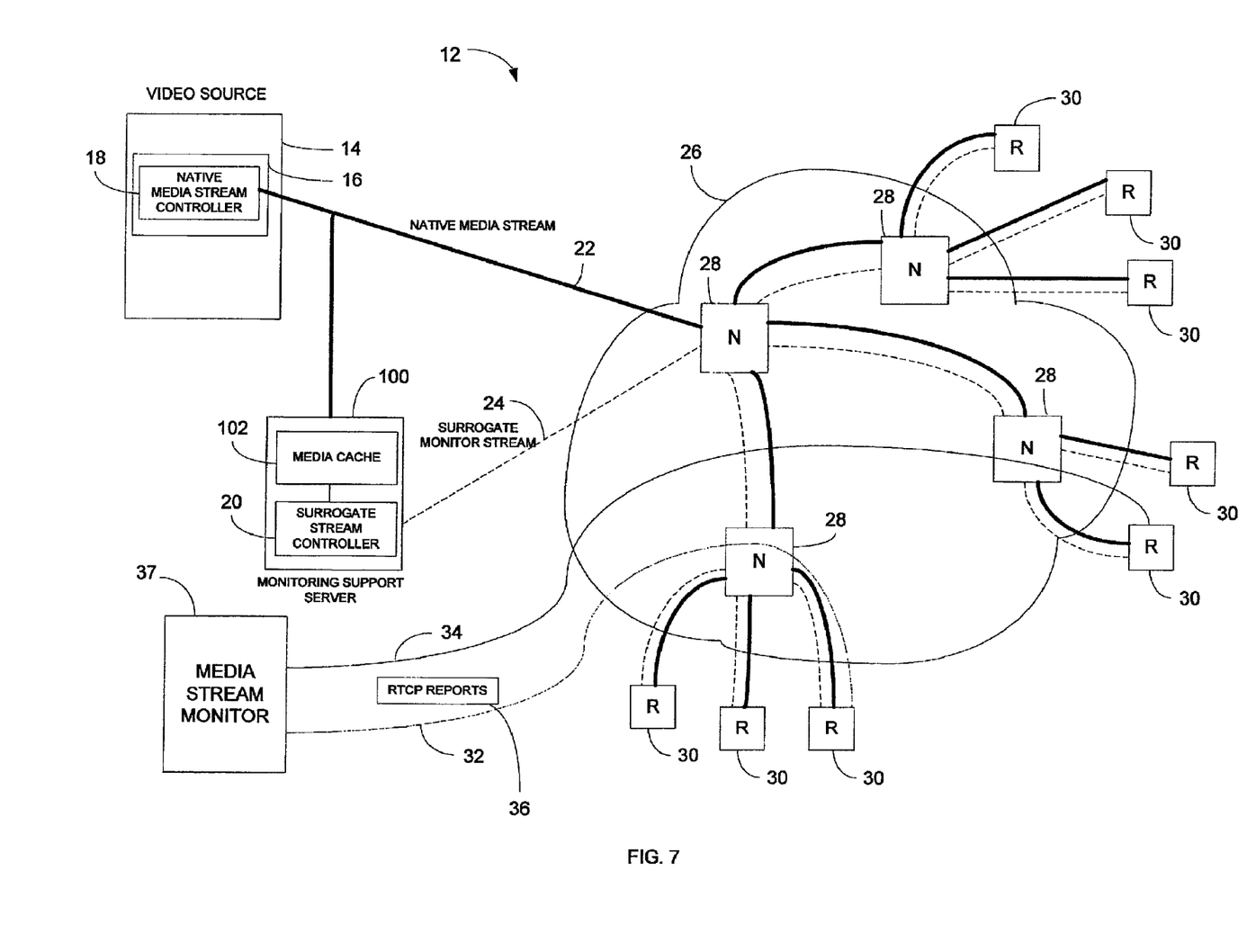
FIG. 7 shows another embodiment where the media stream and surrogate monitor stream are generated from different servers.

FIG. 7 shows another alternative embodiment where a second monitoring support server 100 receives and caches the native media stream 22 in a media cache 102. The same surrogate stream controller 20 as shown in FIG. 2 then generates the surrogate monitor stream 24 that contains the RTP headers and RTP checksum payloads for packets in media stream 22. The remaining operations of the receivers 30 and nodes 28 remain the same. The monitoring support server 100 could be a standalone server or part of a retransmission system that provides media packet retransmissions for packets lost in native media stream 22.

In one embodiment, the media stream monitor 37 could be located in the same server or same location as monitoring support server 100. The media stream monitor 37 could also be located in the same server or location as video source 14. In other embodiments, the video source 14, monitoring support server 100, and media stream monitor 37 could all be located in the same or in different servers and/or locations.

Conclusion

A separate surrogate stream approach provides RTP quality monitoring to an existing UDP only realtime multimedia stream. The new monitor stream is correlated with the existing UDP streams via checksums computed from the media payloads. This surrogate real-time stream allows monitoring of both packet loss and network jitter and requires a relatively small amount of extra bandwidth. The surrogate technique can also provide easier deployment than converting en masse to newer real-time protocols. For example, adding RTP to an entire network infrastructure is a large task, but adding RTP only to the probes may be less work. Thus, smother transition is provided for switching to RTP only systems.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A method comprising:
receiving media packets for a media stream, wherein the media packets are User Datagram Protocol (UDP) packets that contain UDP media payloads and do not contain Real-Time Protocol (RTP) transmission parameters;
generating checksums for at least portions of the media packets with a processing element;
generating RTP transmission parameters for the media packets with the processing element;
combining the RTP transmission parameters with the checksums for the same media packets into monitor packets;
forwarding the received media packets in the media stream to one or more receivers, wherein the media packets are forwarded by the processing element separately from any RTP transmission parameters generated for the media packets; and
transmitting the monitor packets that include the RTP transmission parameters for the media packets as a separate monitor stream for the media stream separately from media in the media packet, wherein both the media stream and monitor stream are sent by the processing element to at least some of the same receivers so Real-Time Control Protocol (RTCP) packet reports for the media stream can be derived using the RTP transmission parameters from the monitor stream.

2. The method according to claim 1 wherein:
the UDP packets in the media stream do not include RTP sequence numbers or RTP timestamps;
RTP sequence numbers and RTP timestamps are generated for the UDP packets and inserted into the monitor packets corresponding to the UDP packets; and
the RTP sequence numbers and RTP timestamps in the monitor packets are used to generate the RTCP reports for the UDP packets in the media stream.

3. The method according to claim 1 including:
generating RTP headers from the UDP packets;
generating UDP checksums for the UDP packets;
combining the RTP headers with the UDP checksums for multiple different UDP media packets into the same monitor packets; and
transmitting the RTP headers and the UDP checksums in the monitor packets of the monitor stream, wherein the monitor stream is transmitted independently of any UDP media payloads from the UDP packets in the media stream.

4. The method of claim 3 including:
compressing the RTP headers generated for multiple UDP packets in the same monitor packets; and
transmitting the monitor packets with compressed RTP headers over the monitor stream.

5. An apparatus, comprising:
one or more processors; and
a memory coupled to the one or more processors comprising instructions executable by the processors, the processors operable when executing the instructions to:
generate checksums for media packets in a media stream, wherein the media packets use a first packet transmission protocol;
generate transmission parameters for the media packets that are not provided by the first packet transmission protocol, wherein the transmission parameters identify when the media packets are received or identify what order the media packets are received;
combine the transmission parameters associated with the media packets with the checksums generated for the same media packets forming monitor packets;
transmit the monitor packets in a different monitor packet stream as supplemental monitoring information for the media stream, wherein the media packets used for generating the checksums are not part of the monitor packet stream.

6. The apparatus according to claim 5 wherein the one or more processors:
identify Real-Time Protocol (RTP) parameters for the media packets;

format the RTP parameters into RTP headers;
attach the RTP headers to the checksums for the same media packets to form the monitor packets; and
send the monitor packets to at least some of a same group of receivers receiving the media packets independently of any media in the media packets.

7. The apparatus according to claim 5 wherein the one or more processors negotiate a monitor stream session for transmitting the monitor packets separately from a media stream session used for transmitting the media packets.

8. The apparatus according to claim 5 wherein the one or more processors:
combine the transmission parameters and checksums for multiple different media packets into the same block monitor packets without including any media payload from the media packets; and
send one or more of the block monitor packets to receivers.

9. The apparatus according to claim 5 wherein the one or more processors:
identify sequence numbers and timestamp values for the media packets;
format the sequence numbers and timestamp values into Real-Time Protocol (RTP) headers; and
combine the RTP headers with the checksums for the same media packets to form the monitor packets without including any media payload from the media packets in the monitor packets.

10. The apparatus according to claim 5 wherein the one or more processors are located either in a same server that transmits the media stream or located in a separate server from the server transmitting the media stream.

11. A method, comprising:
receiving media packets over a media stream connection;
generating a checksum from the media packets;
receiving monitoring support packets in a separate monitor stream connection that contain packet parameter information and checksums for the media packets while omitting payloads from the media packets;
using the checksums in the monitor stream connection to correlate the monitoring support packets with corresponding media packets in the media stream connection; and
using the packet parameter information in the monitoring support packets to monitor transmission metrics for the corresponding media packets.

12. The method according to claim 11 including:
receiving User Datagram Protocol (UDP) media packets that contain MPEG media payloads;
generating checksums for at least a portion of the UDP media packets; and
receiving Real-Time Transport Protocol (RTP) packets that contain the packet parameter information in RTP headers and contain the checksums in RTP packet payloads.

13. The method according to claim 12 wherein:
the UDP packets do not include sequence numbers or timestamps;
the RTP packets include sequence numbers and timestamps for the UDP packets; and
the sequence numbers and timestamps in the RTP packets are used to generate Real-Time Control Protocol (RTCP) reports for the UDP packets.

14. The method according to claim 11 including:
receiving batched monitoring support packets that contain the checksums; and
associated packet parameter information for multiple different media packets.

15. The method according to claim 14 including:
receiving the batched monitoring support packets with compressed headers;
decompressing the compressed headers;
assigning the packet parameter information from the decompressed headers to the media packets having the same checksums; and
generating metrics for the different media packets according to the assigned packet parameter information.

16. An apparatus, comprising:
one or more processors configured to receive both media packets from a media stream and monitor packets from a second separate monitor stream, the one or more processors identifying which monitor packets are associated with the media packets and then using packet transmission parameters in the identified monitor packets to generate packet transmission metrics for the media packets, wherein the one or more processors generate checksums from the media packets and compare the generated checksums with checksums in the monitor packets to identify which monitor packets are associated with which media packets.

17. The apparatus according to claim 16 wherein the one or more processors are located in a same Set Top Box (STB) that receives and outputs the media stream.

18. The apparatus according to claim 16 wherein the one or more processors are in a device separate from a primary receiver that device that stores or renders the media stream.

* * * * *